United States Patent [19]

Holtey et al.

[11] Patent Number: 4,979,104
[45] Date of Patent: Dec. 18, 1990

[54] DUAL MICROPROCESSOR CONTROL SYSTEM

[75] Inventors: Thomas O. Holtey, Newton, Mass.; Thomas L. Murray, Jr., Hollis, N.H.; Wayne A. Perzan, Holbrook, Mass.; Scott W. Smith, Hudson, N.H.

[73] Assignee: Bull HN Information Systems Inc., Billerica, Mass.

[21] Appl. No.: 32,902

[22] Filed: Mar. 31, 1987

[51] Int. Cl.$^5$ ............................................. G06F 9/00
[52] U.S. Cl. .................................. 364/200; 364/230; 364/231; 364/238; 364/240.5; 364/241.9; 364/242.2
[58] Field of Search ... 364/200 MS File, 900 MS File

[56] References Cited

U.S. PATENT DOCUMENTS

3,651,482  3/1972  Benson et al. .................. 340/172.5
4,482,982  11/1984  Yu et al. .......................... 364/900
4,488,231  12/1984  Yu et al. .......................... 364/200

Primary Examiner—Thomas M. Heckler
Assistant Examiner—John G. Mills
Attorney, Agent, or Firm—David M. Driscoll; Faith F. Driscoll; John S. Solakian

[57] ABSTRACT

A microprocessor control system for use in an asynchronous data communication system and comprising a receive microprocessor and a transmit microprocessor along with a paged memory for storing channel line tables. Separate receive and transmit channel number registers control access to the paged memory. Control means is provided preferably in the form of a programmable memory for controlling the sequenching of channel numbers whereby one microprocessor is adapted to access channels in an incrementing manner while the other accesses in decrementing manner. When one microprocessor gains access to a specific line table excludes the other microprocessor from accessing that line table until the first microprocessor suspends off of that line table.

33 Claims, 8 Drawing Sheets

LINE TABLE                                     At $10100

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | TXSUSAD | RXSUSAD | | | TXCATAD | | RXCATAD | | TXCATPC | | | | RXCATPC | | | |
| 1 | RXMSG RXMSG1<br>Receive Message Buffer | RXMSG2 | RXMSG3 | RXMSG4 | RXMSG5 | RXMSG6 | RXMSG7 | RXMSG8 | RXMSG9 | | | | | | |
| 2 | HSKMSG HSKMSG1<br>Transmit Handshake Message | HSKMSG2 | HSKMSG3 | HSKMSG4 | HSKMSG5 | HSKMSG6 | HSKMSG7 | HSKMSG8 | | | | | | | |
| 3 | TXMSG TXMSG1<br>Transmit Message Buffer | TXMSG2 | TXMSG3 | ... | | | ... | UPMSG UPMSG1<br>Transmit Update Mess. | UPMSG2 | | | | RXUPM RXUPM1<br>Receive Update History | RXUPM2 | ... |
| 4 | RXSUBA1 | TXSUBA1 | RXSUBA2 | TXSUBA2 | RXSUBA3 | | | | | | | TXOFMV | RXRSTAD | | |
| 5 | RXTIME<br>Receive Wakeup | TXTIME<br>Transmit Wakeup | | UPTIME<br>Update Time | | RXMETER | | TXDLY1 | TXDLY2 | | | TXDLY3 | LR4HIS | TXDLY1X | |
| 6 | HSKCT | HSKFLG | TESTFLG | ESTFLG | LPMFLG | DULPM | MONFLG | RXWRAP | RXTICK | ESTCT | DLDOT | NOCKFCT | | | |
| 7 | RXCRID | TXCRI | TXCRID | RXCRIW | | | LPMDAT | RXCRCTX | RXCRCT | RXMSCT | RXUPCT | RXTRCT | DWNCT | | |
| 8 | | | | | | | | | | | | | | | |
| 9 | | | | | | | | | | | | | | | |
| A | | | | | | | RXTAAD | | | | | RXGCAD | | | |
| B | SAMHOOK | RXBADS | | | | | | | | | | | | | |
| C | PBXHOOK | HKFLG | DWNFLG | | | | | | | | | TALAD | | | |
| D | TXSTATE | TXALRI | RXSTATE | RXALRI | | LINEMSK | | MYSIG | MYSIGSK | | | | | DXRDYQ | LINENUM |
| E | ADAPID | FLAPID | LINE<br>MODE | MAXRATE | METER<br>MOD | | | HSKDLY | HSK4<br>EVER | | | | | | Line # |
| F | | | | | | | | | | | | | | | |

Fig. 5

RXDAT
RECEIVE
DATA TRANSFER
STATE

| # | Address | Code | Label | Op | Operand | Comment |
|---|---|---|---|---|---|---|
| 1132 | 00002B4E | 117C004400D2 | RXDAT | MOVE.B | #$44,RXSTATE(A0) | SET THE STATE INDICATOR TO 'D' |
| 1133 | | | | | | |
| 1134 | 00002B54 | 317C2B5A004E | | MOVE.W | #RXDAT0,RXRSTAD(A0) | SET RESTART POINT FOR ERRORS |
| 1135 | | | | | | |
| 1136 | 00002B5A | 4228006C | RXDAT0 | CLR.B | NOGKFCT(A0) | INITIALIZE GKF EMPTY COUNTER |
| 1137 | | | | | | |
| 1138 | 00002B5E | 38BC2B6A | | MOVE.W | #RXDA00,(A4) | (==) SET SUSPEND AT RXDA00 |
| 1139 | 0002B62 | 1740A004 | | MOVE.B | D0,RXCHN(A3) | |
| 1140 | 00002B66 | 3A54 | | MOVE.W | (A4),A5 | |
| 1141 | 00002B68 | 4ED5 | | JMP | (A5) | .-. SUSPEND |
| 1142 | | | | | | |
| 1143 | 00002B6A | 102B0001 | RXDA00 | MOVE.B | GKARS(A3),D0 | READ GIGANTIC KINETIC STATUS |
| 1144 | 00002B6E | 6630 | | BNE.S | RXDA00A | .IF DATA PRESENT, BRANCH |
| 1145 | | | | | | |
| 1146 | 00002B70 | 5228006C | | ADDQ.B | #1,NOGKFCT(A0) | TEST FOR EXTENDED GKF EMPTINESS |
| 1147 | 00002B74 | 6708 | | BEQ.S | RXDA00B | .IF SO, BRANCH |
| 1148 | | | | | | |
| 1149 | 00002B76 | 1740A004 | | MOVE.B | D0,RXCHN(A3) | ..... |
| 1150 | 00002B7A | 3A54 | | MOVE.W | (A4),A5 | .:'. |
| 1151 | 00002B7C | 4ED5 | | JMP | (A5) | .-. SUSPEND |
| 1152 | | | | | | |
| 1153 | 00002B7E | 316BA0060050 | RXDA008 | MOVE.W | NOW(A3),RXTIME(AC) | SET RXTIME FOR NOW PLUS 20 MS. |
| 1154 | 00002B84 | 066800C00050 | | ADD.W | #192,RXTIME(AC) | |
| 1155 | | | | | | |
| 1156 | 00002B8A | 1740A004 | | MOVE.B | D0,RXCHN(A3) | ..... |
| 1157 | 00002B8E | 3A54 | | MOVE.W | (A4),A5 | .:'. |
| 1158 | 00002B90 | 4ED5 | | JMP | (A5) | .-. SUSPEND |
| 1159 | | | | | | |
| 1160 | 00002B92 | 0C0000C8 | RXDA00C | CMP.B | #GKOKEND,D0 | TEST FOR NORMAL END OF MESSAGE |
| 1161 | 00002B96 | 6604 | | BNE.S | RXDA00D | .IF NOT, BRANCH |
| 1162 | 00002B98 | 4EBA0DD6 | | JSR | RXGKEU(PC) | .IF SO, GKF UNNATURAL ERROR |
| 1163 | | | | | | |
| 1164 | 00002B9C | 4EBA0D6C | RXDA00D | JSR | RXGKE(PC) | CALL EXCEPTION HANDLER & REDO TESTS |
| 1165 | | | | | | |
| 1166 | 00002BA0 | 0C000048 | RXDA00A | CMP.B | #GKOKDAT,D0 | TEST FOR NORMAL DATA |
| 1167 | 00002BA4 | 66EC | | BNE.S | RXDA00C | .IF NOT, BRANCH |
| 1168 | | | | | | |
| 1169 | 00002BA6 | 1153001C | | MOVE.B | (A3),RXMSG(A0) | STORE GKF DATA - HEADER BYTE |
| 1170 | 00002BAA | 177C0000043 | | MOVE.B | #0,GKAWSI(A3) | .CLEAR GKF STATUS & INCREMENT TAKE |

DUAL MICROPROCESSOR CONTROL SYSTEM

RELATED APPLICATION

The following U.S. patent application filed on an even date with the instant application and assigned to the same assignee as the instant application, is related to the instant application:

"A Firmware State Machine" by Thomas Holtey, et al U.S. Ser. No. 07/032,896, filed Mar. 31, 1987.

BACKGROUND OF THE INVENTION

1. Field of the Invention

The present invention relates in general to a dual microprocessor control system and pertains, more particularly, to dual microprocessor control in an asynchronous data communication system preferably employing a receive microprocessor and a transmit microprocessor.

2. Description of the Prior Art

In a data communications system employing a telephone PBX, line data rates may vary from 300 to 19,200 bits per second. At a rate of 19,200 bits per second, with 16 channels operating, this means that a character is to be supplied for transmission each 52.1 microseconds. Similarly, a character may be received each 52.1 microseconds. With such data volume requirements, it is typical to employ a pair of microprocessors. One microprocessor is dedicated to transmitting signals and the other is dedicated to receiving signals. Even with the use of these dual microprocessors this still allows only a small amount of time for control tasks such as packetizing/depacketizing data, handling modem status update messages, call processing, etc.

In addition to the specific tasks of transmitting and receiving for the respective transmit microprocessor and receive microprocessor, it is also desired that the transmit and receive microprocessors be able to communicate with each other. When the two processors interchange information, it is desired to de-race the communications. This is usually carried out with interrupt-driven techniques employing "mailboxes" and "locks". However, such an interrupt-driven system is relatively slow in operation. For pertinent prior art refer to U.S. Pat. No. 4,482,982 granted Nov. 13, 1984, to Yu et al. and U.S. Pat. No. 4,488,231 granted Dec. 11, 1984, to Yu et al., both owned by the present assignee herein.

Accordingly, it is an object of the present invention to provide an improved dual microprocessor control system in which the efficiency of intercommunication between processors is substantially improved.

SUMMARY OF THE INVENTION

To accomplish the foregoing and other objects, features and advantages of the invention there is provided in accordance with the present invention a dual microprocessor control system that is employed in the embodiment disclosed herein in an asynchronous data communications system that employs a receive microprocessor and a transmit microprocessor. The microprocessor control system of the invention permits improved efficiency of data transfer within the data communication system including between microprocessors. The dual microprocessor system of the invention may be employed in a system for the transfer of data, control and signalling information as is required to support operation between a number of terminal devices and a computer system. A specific example of an operating environment is in a data communication system between multiple terminal devices (greater than the number of processors), a PBX trunk line and a computer system such as the Honeywell DPS-6. Although the concepts of the present invention are described in association with such a system it is understood that these concepts have broader application.

The invention claimed herein is embodied in a dual microprocessor control system that includes a first microprocessor preferably referred to as a receive microprocessor having address and data busses associated therewith and a second microprocessor, preferably a transmit microprocessor also having address and data busses associated therewith. Memory means are included having address and data busses also associated therewith. Means are provided intercoupling the first and second microprocessor data busses to the memory means data bus. Means are provided intercoupling the first and second microprocessor address busses to the memory means address bus including means for establishing channel numbers, corresponding to line tables of the memory means, for both microprocessors, and further including control means for changing channel numbers but preventing the simultaneous addressing of the same channel. The means for establishing channel numbers preferably includes a receive channel number register and a transmit channel number register, each which may be of, for example, four bit quantity. The control means may include a programmable memory. Lines couple the channel number registers to the input of the programmable memory. There is a further input to the programmable memory to indicate which register is to change number. The programmable memory is adapted to control the changing of channel numbers so that one microprocessor is adapted to access channels in an incrementing manner while the other acesses in a decrementing manner. For example, the receive microprocessor may regress through channel numbers in a reverse direction while the transmit microprocessor may progress in the normal forward direction. If there is a conflict then either transmit or receive microprocessor can skip an address if it represents an address that the other microprocessor is at.

BRIEF DESCRIPTION OF THE DRAWINGS

Numerous other objects, features and advantages of the invention should now become apparent upon a reading of the following detailed description taken in conjunction with the accompanying drawings, in which:

FIG. 5 is a segment of a firmware state diagram useful in illustrating the task suspension concepts of the invention;

DESCRIPTION OF A PREFERRED EMBODIMENT

Figure 1:
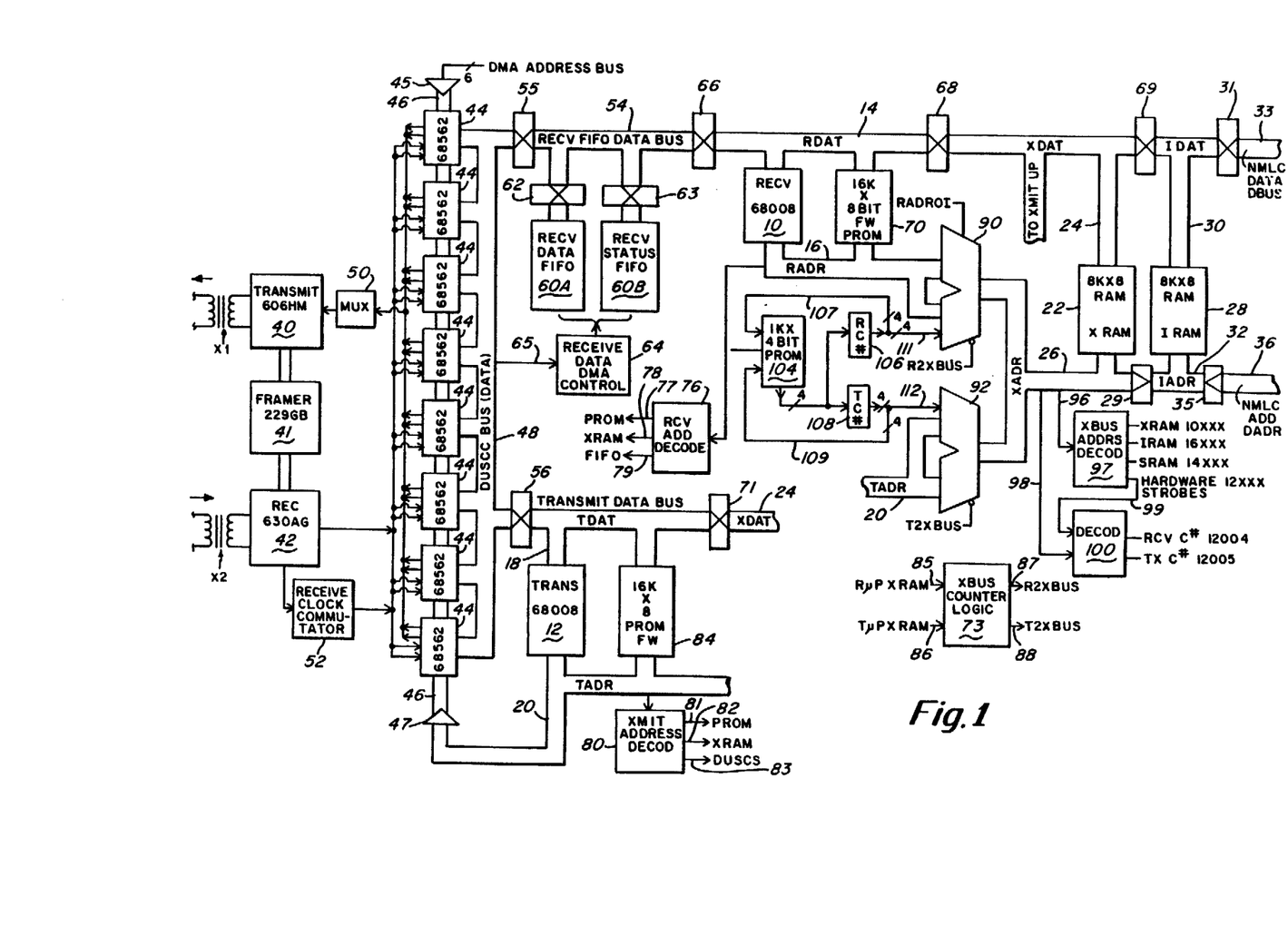
FIG. 1 is a block diagram of a data communications system embodying the principals of the present invention for dual microprocessor control.

Reference is now made to the block diagram of FIG. 1. This block diagram illustrates a digital asynchronous multiplex adapter system that provides for the transfer of data, control information and signalling information as required to support operations between a number of terminal devices coupled by a telephone line to the left in the diagram, and a computer system and associated controller that would be coupled from the right of the diagram of FIG. 1. More particularly, the terminal devices may be connected via AT&T terminal adapters, an AT&T system 85 PBX and the PBX digital multiplex interface trunk, and applications running in a computer system such as a Honeywell DPS-6 supported via the asynchronous multiplex adapter system and a multiline communication controller. For the sake of simplicity herein, the terminal devices, and multiline communication controller, are not described in detail herein.

The microprocessors, the control of which is the subject of the present invention, are illustrated in FIG. 1 as a receive microprocessor 10 and a transmit microprocessor 12. Both of these microprocessors may be of conventional type 68008. Associated with the receive microprocessor 10 is the receive data bus 14 and also the receive address bus 16. Associated with the transmit microprocessor 12 is the transmit data bus 18 and the transmit address bus 20.

FIG. 1 also illustrates the XRAM 22 having associated data bus 24 and address bus 26. In the block diagram of FIG. 1, the IRAM 28 is disposed adjacent to the XRAM 22. The IRAM 28 similarly has associated therewith a data bus 30 and an address bus 32. The databus 30 couples by way of transceiver 31 to the output data bus 33 which is adapted to couple to a multiline communication controller, not illustrated herein. Similarly, the address bus 32 is adapted to couple by way of transceiver 35 to the address bus 36. The address bus 36 is adapted to likewise couple to a multiline communication controller, not illustrated herein.

Herein reference is made to the use of tranceivers used in association with address and data busses, such as the aforementioned transceiver 35. However, in some instances these devices may be substituted for by tri-statable buffers.

As indicated previously, the system illustrated in the block diagram of FIG. 1 is adapted to connect to up to 16 terminal devices at any one time via a digital multiplex interface trunk. In this connection to the left in the block diagram of FIG. 1 note the coupling transformer X1 for the transmission of signals from the transmitter 40. Also note the coupling transformer X2 for the receipt of signals by the receiver 42. Coupled between the transmitter and receiver is a framer 41. The transmitter 40, receiver 42 and framer 41 are all standard AT&T circuits. The transmitter is of type 606 HM. The framer circuit is of type 229GB. The receiver is of type 630AG.

The block diagram of FIG. 1 also shows communication between both the transmitter 40 and the receiver 42 to the data circuits 44. The circuits 44 are commonly referred to as DUSCC chips. Each of these is a dual universal serial communication controller (DUSCC). These circuit chips are conventional and are identified by Signetics part number 68562. As illustrated in FIG. 1 there are eight of these data circuits 44. Each circuit 44 comprises two communication channel processors. Also note in FIG. 1 the address bus 46. With each of the data circuits 44 being comprised of two communications channels, there are a total of 16 lines that couple to the DUSCC data bus 48.

With regard to communication at the data circuits 44, it is also noted in FIG. 1 that there is provided a multiplexer 50 that provides communication, as to be described in further detail hereinafter, between the data circuits 44 and the transmitter 40. Also illustrated in the block diagram of FIG. 1 is a receive clock commutator 52 that controls the transfer of data from the data circuits 44 to the receiver 42. This operation is also described in further detail hereinafter.

Basically, the outputs from the data circuits 44 are multiplexed by the multiplexer 50 and are coupled to the transmitter 40 in a time division multiplexed manner. The receiver inputs of each of the data circuits 44 are connected in common as illustrated in the diagram and there is provided a clocking scheme (see commutator 52) that delivers 8 clock pulses to each of the data circuits 44 in sequence. The clock signals from the receiver 42 are de-multiplexed and decoded and delivered to each of the 16 channels of the data circuits 44 on a time division multiplex basis.

As indicated previously, the data circuits 44 have a common address bus 46. This address bus is comprised of 6 address lines which may be driven semi-directly from the transmit microprocessor 12. Note in FIG. 1 that the transmit address bus 20 couples by way of buffer 47 to the data circuits address bus 46.

As indicated previously, the transmit microprocessor 12 is of type 68008. The transmit microprocessor 12 at its address bus provides for substantially direct addressing of the data circuits 44. Also note that the address bus 46 for the data circuts 44 may be controlled from direct memory access (DMA) control logic. In this regard note the coupling at buffer 45 in FIG. 1. This particular DMA address control is used to access the data circuits 44 for receiving data. The transmit microprocessor 12 on the other hand accesses the same bus 46 directly for transmitting data and also for set-up.

The data circuits 44 all have a common data bus 48 which is referred to as the DUSCC data bus. It is noted that this data bus 48 is separated from the receive fifo data bus 54 by a transceiver 55. Similarly, the data circuits 44 data bus 48 is separated from the transmit data bus 18 by a further transceiver 56. With regard to access to the address bus 46, conventional control logic is provided to assure that the transmit microprocessor 12 is not on the bus 46 at the same time that the DMA controller is.

As indicated previously, the DUSCC data bus 48 couples by way of transceiver 55 to the receive fifo data bus 54. Coupled from the bus 54 is a large capacity fifo illustrated in the block diagram of FIG. 1 in two parts including a receive data fifo 60A and a receive status fifo 60B. Hereinafter this will be referred to from time to time as fifo 60. The receive data fifo 60A couples to the fifo data bus 54 by way of the transceiver 62. Similarly, the receive status fifo 60B couples to the fifo data bus 54 by way of the transceiver 63. Also illustrated in FIG. 1 is the receive data DMA controller 64 which provides control to the fifo 60. Also note in FIG. 1 the line 65 coupling from the DUSCC data bus 48 to the controller 64.

In two bus cycles data is read out of the data circuits 44 via the transceivers 55, 62 and 63, including both status and data, storing this information in the fifo under control of the receive data DMA controller 64. This data and status information is stored in the fifo 60 and is accessed by the receive microprocessor 10. In this regard, note that the data bus 14 associated with the receive microprocessor 10 is coupled to the fifo data bus 54 by way of the transceiver 66. The receive microprocessor 10 accesses the fifo 60 whenever it has a chance and it does so by way of a polling scheme. More particularly, the receive microprocessor 10 interrogates the fifo 60 and checks the status indication therein to find out if anything is stored in the data section of the fifo 60. If it is, it reads the status and data information into the XRAM 22 where it is stored. It actually stores the data in the XRAM 22, checks the status and takes appropriate action if necessary. In this connection note that the communication from the receive microprocessor 10 is by way of the receive data bus 14 and the transceiver 68 to the X-data bus 24. There is also a further transceiver 69 that intercouples the X-data bus 24 with the I-data bus 30.

The receive data bus 14 has coupled thereto, in addition to the receive microprocessor 10, the firmware prom 70. This prom 70 is preferably a 16K by 8 bit prom or eprom.

As indicated previously, the X-data bus 24 is coupled to the R-data bus 14 by transceiver 68. Similarly, there is also a further transceiver 71 that intercouples the X-data bus 24 to the transmit data bus 18. Control logic circuitry assures that the receive microprocessor 10 and transmit microprocessor 12 are never both on the X-data bus 24 at the same time.

As indicated previously, the X-data bus 24 couples to the I-data bus by way of the transceiver 69. The I-data bus 30 in turn couples to the controller output bus 33 by way of the transceiver 31. Similarly, the I-address bus 32 intercouples between the X-address bus 26 and the controller address bus 36. The intercoupling is provided by means of transceivers 29 and 35. The microprocessor that has control of the X-bus, at that instant in time, is the only one that can access the I-bus. In this regard, X-bus contention logic is used for controlling access to the X-bus. The X-bus contention logic is illustrated in FIG. 1 at 73. It is furthermore to be noted that either the receive microprocessor 10 or the transmit microprocessor 12 can access the X-data bus 24.

In addition to the receive data bus 14 associated with the receive microprocessor 10, there is also a receive address bus 16 associated with the receive microprocessor 10. The receive address bus 16 also intercouples to the firmware prom 70. A decode of the address bus 16 also occurs and in this connection refer in FIG. 1 to the receive address decoder 76. The decoder 76 decodes higher order bits of the address bus 16.

The decoder 76 has illustrated at the output thereof three separate lines that indicate decodes for communication with different system components. For example, one decode at output line 77 indicates data access to the receive microprocessor prom 70. Another decode at line 78 indicates data access to the XRAM 22. Still a further decode at line 79 indicates data transfer from the fifo 60.

In the block diagram of FIG. 1 also refer to the transmit address bus 20. It is noted that there is also a transmit address decoder 80 coupled from this address bus. This decoder 80 also has three output lines coupled therefrom. A first decode at line 81 indicates data transfer from the transmit microprocessor prom 84. In this regard, it is noted that the firmware prom 84 is a 16K by 8 bit prom that couples to both the transmit data bus 18 and the transmit address bus 20. The address decoder 80 has a second decode output at line 82 that decodes access to the XRAM 22. There is also a third decode at line 83 from the transmit address decoder 80 indicating data transfer to the DUSCC bus 48.

Because the transmit microprocessor 12 cannot hardwarewise access the fifo 60, the same address space is used for the data circuits 44 on the transmit microprocessor. Similarly, the receive microprocessor 10 cannot physically address the data circuits 44 as neither the address nor data busses couple directly thereto. Therefore, that address space is used for the receive data fifo 60.

Either of the microprocessors 10 or 12 may access an address space that points to the IRAM 28. In the disclosed embodiment this is an address base between 16,000 hexadecimal and 18,000 hexidecimal. Access to the IRAM 28 is via the X-bus (data bus 24 and address bus 26).

Also illustrated in FIG. 1, and referred to hereinbefore, is the X-bus contention logic 73. The inputs thereto are two separate signals indicating that the receive microprocessor wants to go to the XRAM 22 or the transmit microprocessor wants to go to the XRAM 22. These signals are coupled to the logic 73 on lines 85 and 86. Similarly, there are outputs on lines 87 and 88 which are identified in FIG. 1 as respective signals R2XBUS and T2XBUS. The bus contention logic 73 basically permits one but not both processors to access the XRAM. Again, the respective signals are the signals R2XBUS at line 87 and T2XBUS at line 88. It is noted that these signals couple respectively to the address multiplexers 90 and 92 as enable inputs thereto. The XBUS contention logic 73 is considered to be of well-known conventional design.

Figure 2:
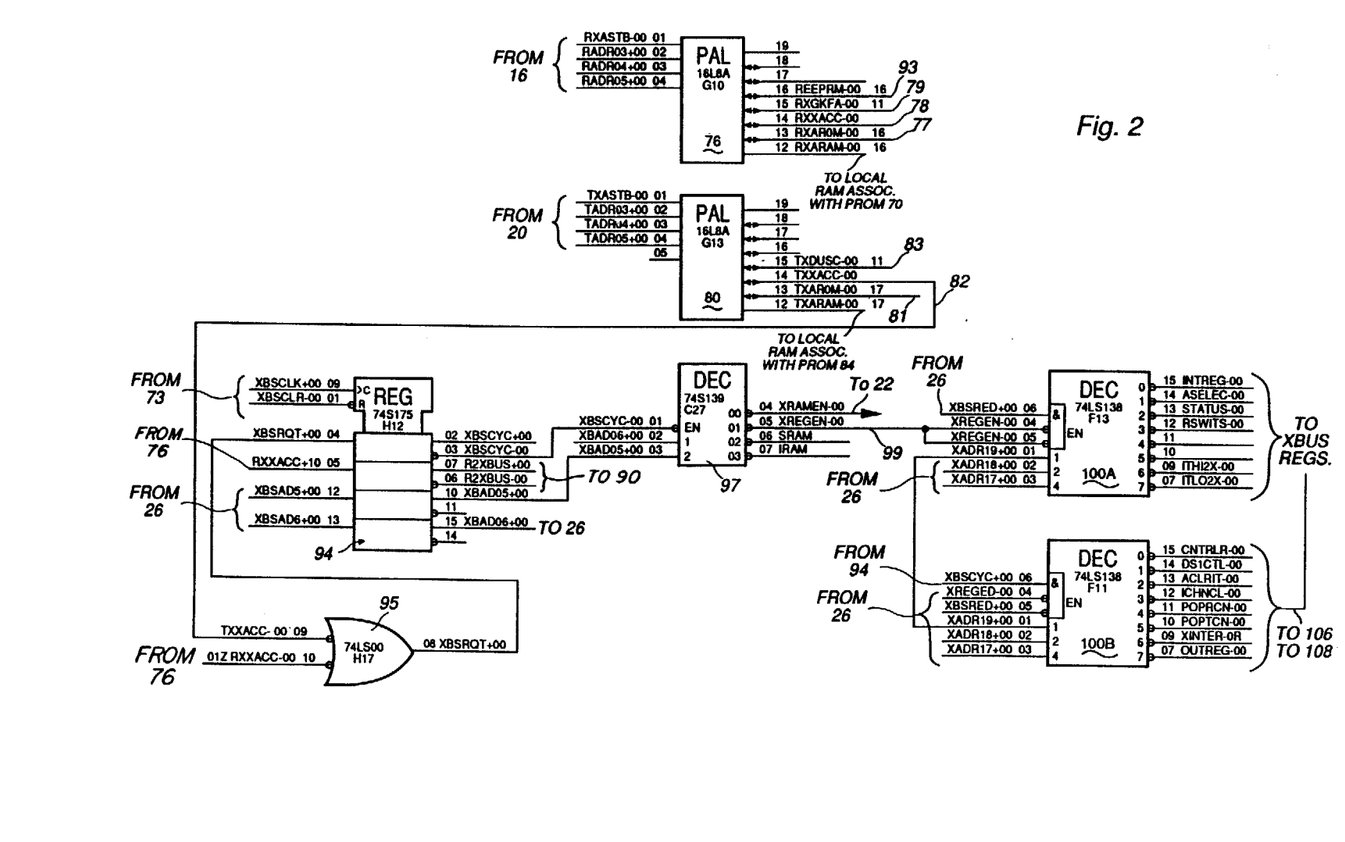
FIGS. 2, 3A and 3B illustrate further specific block diagrams for portions of the system illustrated in FIG. 1.

Reference is now made to the more detailed circuit block diagram of FIG. Z illustrating further details of some of the blocks of FIG. 1 including the receive address decoder 76 and the transmit address decoder 80. Each of these decoders 76 and 80 illustrated in FIG. 2 are implemented by a programmable array logic (PAL). In this connection, refer to Appendix A attached hereto for an illustration of the PAL equations for decoders 76 and 80. Both decoders 76 and 80 may be of type 16L8A. Identified in FIG. 2 are also the output lines 77–79 associated with the receive address decoder 76 previously identified in FIG. 1 and also, previously identified in FIG. 1, the output lines 81–83 from the transmit address decoder 80.

In connection with Appendix A, it is noted that for both decoders 76 and 80 there are provided equations for decoding each of the output signals. These equations illustrate decodes of addresses RADR03-RADR05 on the receiver side and addresses TADR03-TADR05 on the transmit side. Along with these addresses is also the respective strobe signals. Associated with the receive microprocessor is the signal RXASTB and associated with the transmit microprocessor is the signal TXASTB. These are respective microprocessor strobe signals indicating that either of the microprocessors has placed a valid address on the bus.

The receiver address decoder 76 basically breaks the receive microprocessor address space into four parts. A first part is the signal RXAROM at line 77 which decodes the firmware prom 70. There is also the signal REEPRM at line 93 which is basically of little interest herein because the EEPROM is not illustrated herein. Next is the signal on line 78 which is the signal RXXACC— which is a receive microprocessor access to the X-bus. Finally, it is the signal on line 79 which is the signal RXGKFA—for the fifo 60.

In FIG. 2 below the decoder 76 is the decoder 80 which also breaks out similar signals and address spaces including the signal on line 82 identified as signal TXXACC—which indicates the transmitter microprocessor going to the X-bus. Also is the signal on line 83 identified as the signal TXDUSC—which indicates the transmit microprocessor going to the data circuits 44.

It is noted that, in FIG. 2, the signal RXXACC is coupled to a register 94. Also coupled to this register is the signal XBSRQT (bus request) coupled from gate 95. The gate 95 may be of type 74LS00. It is noted that gate 95 also receives both signals TXXACC—and RXXACC—. These two signals are the signals requesting the XRAM 22. The top two outputs from the register 94 are the signals XBSCYC+ and XBSCYC—. These are the bus request signals. Also note the signals R2XBUS+ and R2XBUS— from the register 94. These signals combined with the signal XBSCYC control whether the receive or the transmit microprocessor is going to the X-bus.

As indicated previously, there is also the signal RXXACC+ coupled to the register 94 indicating that it is the receive microprocessor that is requesting. This generates the two aforementioned signals R2XBUS+ and R2XBUS—. X-bus cycles are always permitted to one of the two microprocessors to be determined by the state of the signal R2XBUS. If there is a X-bus cycle request with the absence of the R2XBUS signal then this indicates that it is a T2XBUS request.

It is noted that the output of the register 94 which may be of type 74S175 couples to a further decoder 95 which may be of type 74S139. In particular, the signal XBSCYC— couples to the enable input of that decoder. The decoder 95 captures the address bits XBAD05+ and XBAD06+ from the microprocessor that wins to give a head start on decoding in the next cycle.

Presuming that one of the microprocessors 10 and 12 has in fact asked for and received the X-bus, the addresses from the microprocessor couple by way of either the receive address bus 16 or the transmit address bus 20 to the respective multiplexers 90 and 92 illustrated in FIG. 1. The multiplexer 90 receives the receive microprocessor addresses and the multiplexer 92 receives the transmit microprocessor addresses. These addresses are coupled through the multiplexers depending upon which one was enabled by the signals coupled to the enable inputs thereof. These are the respective signals R2XBUS and T2XBUS. The output of the multiplexers couples in common to the X-address bus 26.

With further reference to FIG. 1, it is noted that further decoding occurs off of the X-address bus 26. In this connection note the address line 96 coupling to the X-address bus address decoder 97. A further line 98 along with a line 99 from the decoder 97 couples to a further decoder 100. The addresses coupled to the decoders 97 and 100 are higher order bits of the address bus 26. Once again, reference is made to FIG. 2 and the register 94 with two of the lower disposed stages thereof showing storage of address bits 5 and 6 (XBAD05 and XBAD06). These are decoded in the presence of an X-bus cycle (XB5CYC) to determine whether signals are to be coupled to the XRAM, IRAM, SRAM, or hardware strobes. In FIG. 1 these different signals are depicted at the output of the X-bus address decoder 97. FIG. 1 also illustrates to the right of each of these signals the particular addresses involved. The hardware strobes are at an address of 12XXX hex, XRAM access is decoded at an address of 10XXX hex, the S-bus access is at address 14XXX hex, and the I-bus address is at 16XXX hex.

In FIG. 1 reference has been made to the X-bus address decoder 97. This is the same decoder as illustrated in FIG. 2 as decoder 95 and there is shown therein the four output signals. On the first line is the signal XRAMEN which is the XRAM enable signal. On the next line is the signal XREGEN which is the hardware strobe register enable. The next line is the signal SBUSAC which is the SRAM access signal. Finally, on the last line is the signal IBUSAC which is the IRAM access signal. With regard to the reference to the SRAM, it is noted that this device has not been described herein as it is not believed to be necessary in the explanation of the concepts of the present invention.

It is noted in both FIGS. 1 and 2 that the signal XREGEN couples to a further decoder This is identified in FIG. 1 as the decoder 100 and it is identified in FIG. 2 as separate decoders 100A and 100B. Both decoders 100A and 100B may be of type 74LS138. The decoders 100A and 100B provide hardware decoder strobes. The decoder 100A is the read only strobes. This provides enables on to the busses, mostly the X-bus. The decoder 100B is write only strobes and in particular there are two signals that are of interest coupled therefrom. These are the signals POPRCN— and POPTCN— corresponding to physical hardware addresses of 12,004 and 12,005 hex. The address 12,004 is the signal POPRCN— which changes the receive channel number. The address 12,005 is the signal POPTCN— which changes the transmit microprocessor channel number. In this connection note the two respective outputs from decoder 100 in FIG. 1 identified as the respective receive and transmit channel number signals.

Reference is made once again to the block diagram of FIG. 1 for the portion of the system that uniquely controls transmit and receive channel numbers. In this connection refer to the control prom 104. The capacity of the prom 104 is to be at least 1K by 4bit. Also illustrated in FIG. 1 is the receive channel number register 106 and the transmit channel number register 108. It is noted that each of these registers 106 and 108 is a four bit register. The four bits identify up to 16 separate channels or tables. Thus, there are four bits coupled by way of line 107 from the register 106 to the input of the prom 104. Similarly, there are four bits coupled on line 109 from the register 108 also to the input of the prom 104. The outputs of the registers 106 and 108 at the respective lines 111 and 112 couple to the receive and transmit microprocessor X-bus multiplexers 90 and 92. The multiplexers provide an alternative way of addressing the X-bus 26. As indicated in FIG. 1 at one side of the multiplexers the addresses from the registers 106 and 108 are coupled along with other addresses either from the receive address bus 16 or from the transmit address bus 20. The four bits from these registers change some of the middle weight address bits. They do so in such a way that, when addressing the X-bus, they break the X-bus addresses into 256 byte chunks. There are 8 address bits below these four and then there are higher order bits that are used to actually decode the X-address.

Figure 6:
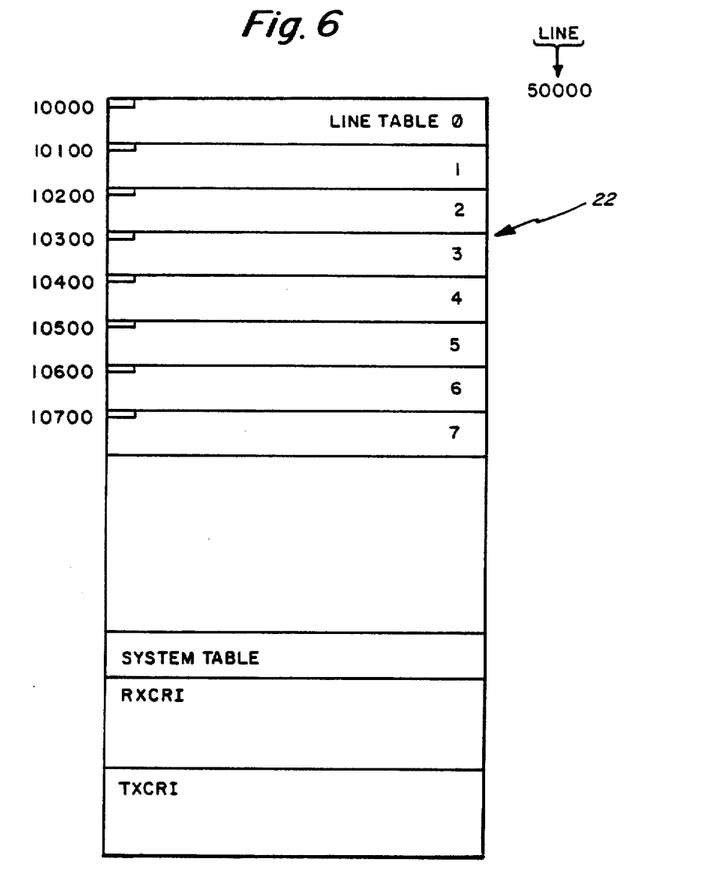
FIG. 6 schematically illustrates any one of the multiple paged line tables with associated codes.

Let it be assumed that the transmit microprocessor 12 is to access the paged XRAM 22 at channel number 4. Access is to be provided to the line table for channel number 4. In this regard refer to the schematic diagram of FIG. 6 which shows the XRAM 22 separated into multiple line tables. There are actually 16 line tables. However, for simplicity in FIG. 6 only line tables 0–7 are illustrated. FIG. 6 also illustrates the associated addresses to the left of the line table designations. The physical address for line table number 4 is 10,400. The lower order two digits are the actual location within the line table for 256 locations. The next digit up from that is the four digit line number so the address would be 104 for the line number 4.

Figure 4:
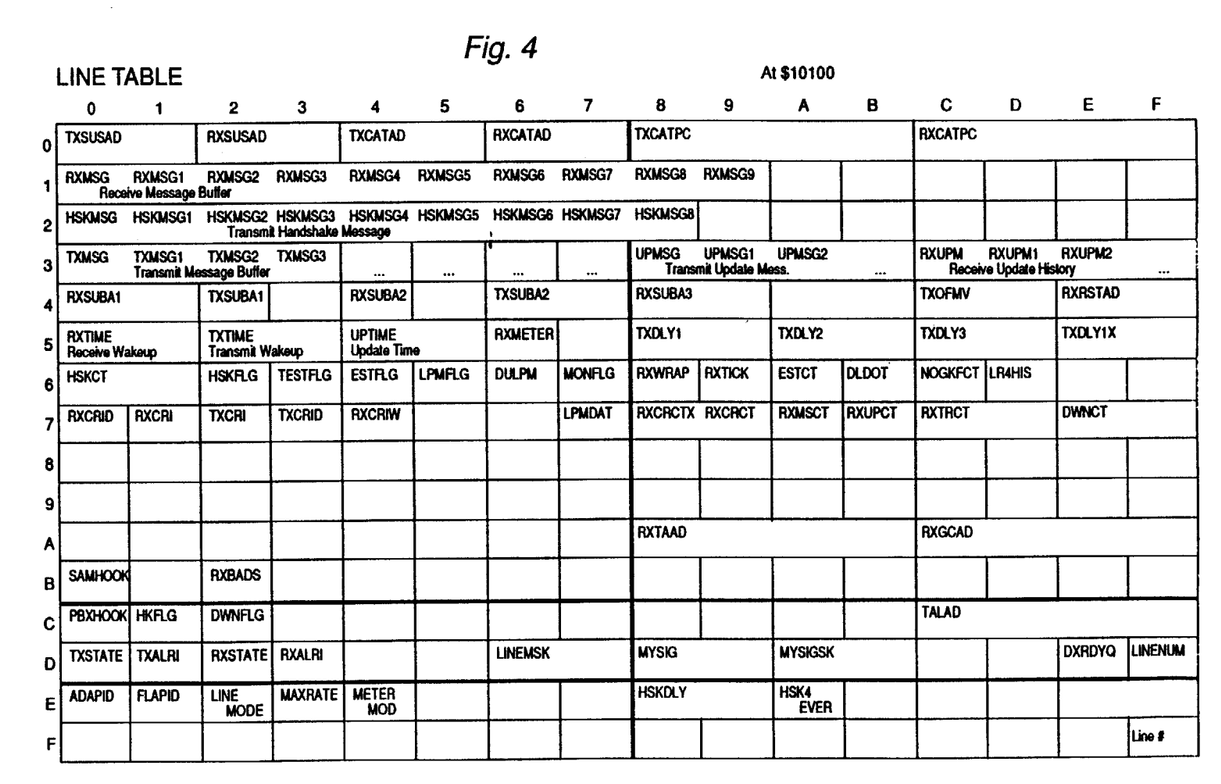
FIG. 4 is a line table diagram for one of the 16 line tables stored.

With regard to the separate line tables, refer now to the more detailed diagram of FIG. 4 which shows one of the line tables, namely the line table number 1 with an address of 10,100. It is noted that this line table is comprised of 256 bytes designated in a tabular manner by locations 0–9 and A–F. Each of these bytes is comprised of 8 bits. In order for the XRAM 22 to store all of this line table data there is required a capacity of 256 locations times the 16 line tables or in other words a capacity of 4K by 8 bits. In the particular implementation illustrated in FIG. 1 the capacity employed is actually twice that amount, the remainder being used in an unpaged manner.

As indicated previously, for channel four the address is 10,4XX. If it were the same location but on channel number 5 then the address is 10,5XX. Similarly, if the system is going to page IRAM, which also is driven off of the same bus, it is paged in the same manner by the same mechanism. One would go to address 16,4XX for something on line 4 or 16,5XX for something on line 5. The same numbers are valid for the receive microprocessor and that is how the receive and transmit microprocessors can pass information between each other very easily.

Now, if either of the microprocessors 10 or 12 wish to address the XRAM 22 using this paging scheme, then, instead of addressing by line 4, address XX, (104XX) the addressing occurs via a scheme using a single higher order bit. The address instead is 50,0XX. This pulls in the receive or transmit line number, depending upon which microprocessor is under control. Depending upon whether in transmit or receive modes the address is multiplexed into the middle bits of that byte in the same physical address position. With this technique the receive microprocessor and the transmit microprocessor need never know which line is presently being accessed in order to access the appropriate line table. The processor simply addresses 50,0XX and gets its line number, forced by hardware to the correct physical address for whatever byte it happens to be interested in. This is the way that this paging algorithm works.

Figure 3A:
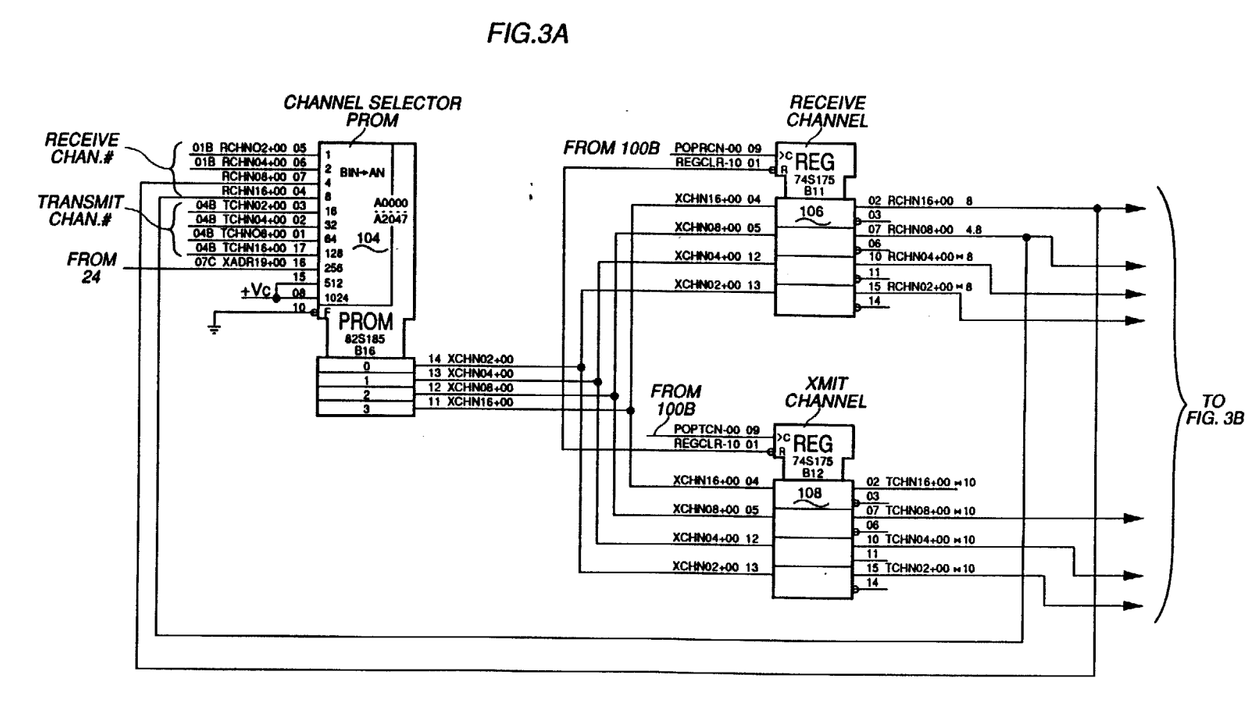
Figure 3B:
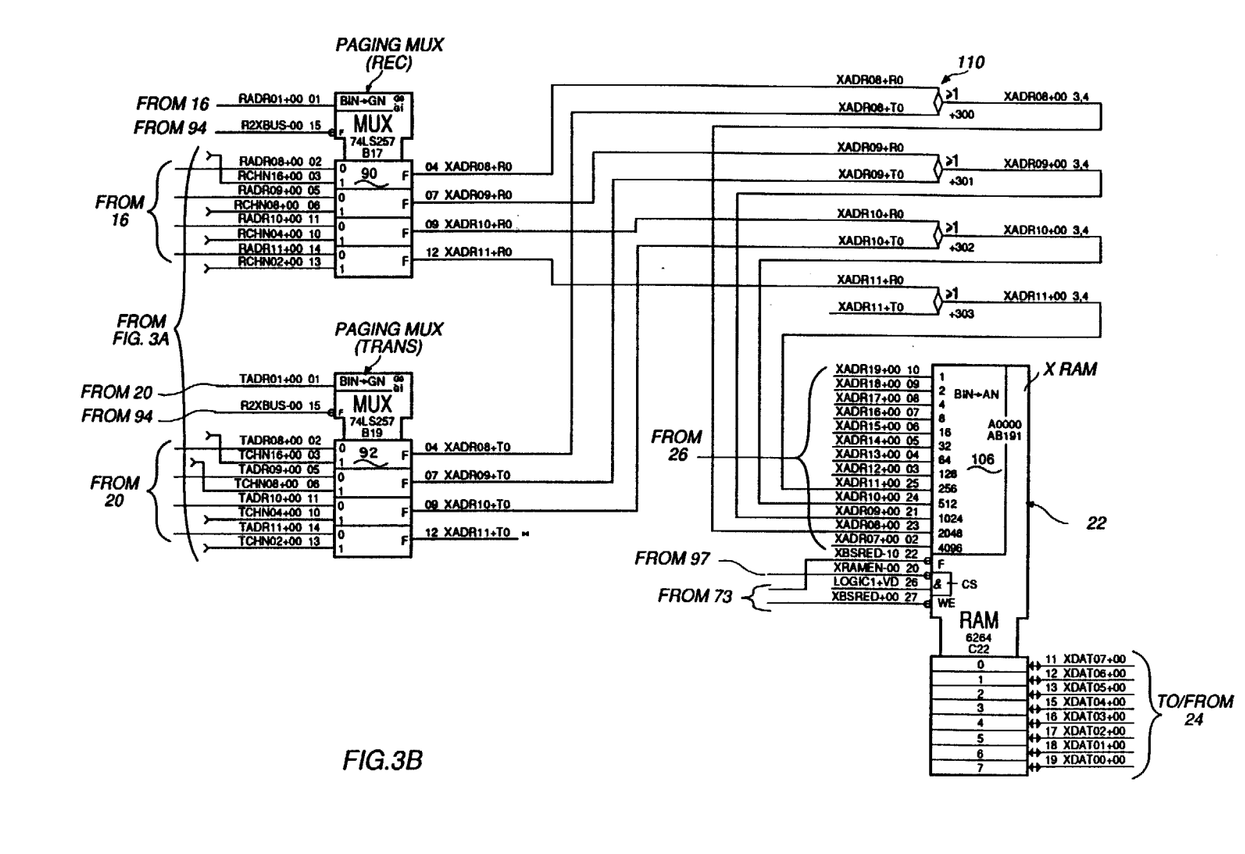

Next, is a discussion of the actual hardware and firmware for changing the line numbers either on the receive microprocessor 10 or the transmit microprocessor 12. The following is a discussion as to how the logic operates and the manner in which it is implemented in firmware. The channel number selection, for selecting specific line tables of the XRAM 22 involves the prom 104 illustrated in FIG. 1 along with the registers 106 and 108 and the multiplexers 90 and 92. Refer now also to the more detailed diagram of FIG. 3 which shows the channel selector prom 104. This is implemented by a circuit 82S185. FIG. 3 also shows the receive channel register 106 and the transmit channel register 108. Both of these may be implemented by circuit types 74S175. FIG. 3 also shows the paging multiplexers for receive and transmit illustrated by the respective multiplexers 90 and 92. These may be implemented by circuit type 74LS257. It is noted that both of the multiplexers have enable inputs that require a negative logic input for enable. Thus, the paging multiplexer for receive is enabled by the signal R2XBUS− while the paging multiplexer for the transmit mode is enabled by the signal R2XBUS+. In essence, when in the receive mode the signal R2XBUS+ is positive and thus the signal R2XBUS− is negative thus enabling only the multiplexer 90 driving the receive microprocessor addresses to the XBUS.

The channel selector prom 104 may be a 1K or 2K by 4 bit prom. The prom 104 receives 9 address bits. Four of these bits are from the receive line register and 4 bits are from the transmit line register. One bit determines whether the transmit of receive microprocessor is changing table number. This is the signal XADR19+- shown coupled to one of the inputs of the prom 104. The four inputs from the receive channel register 106 are the signals RCHN02+; RCHN04+;RCHN08+; and RCHN16+. The four inputs from the transmit channel register 108 are the signals TCHN02+; TCHN04+; TCHN08+; and TCHN16+. The outputs from the channel selector prom 14 are the signals XCHN02+; XCHN04+; XCHN08+; and XCHN16+.

The four outputs from the channel selector prom 104 couple to the two registers 106 and 108. These are the respective receive channel number register and the transmit channel number register. Both of these registers are four bit registers. The outputs from the register 106 include the signals RCHN02; RCHN04+; RCHN08+; and RCHN16+. The signals from the transmit register 108 include the signals TCHN02+; TCHN04+; TCHN08+; and TCHN16+.

FIG. 3 also illustrates on the right of the diagram the multiplexers 90 and 92 which drive either the straight-through microprocessor addresses or the microprocessor addresses with the line number substituted for the middle bits. Also, the transmit multiplexer drives the transmit straight-through microprocessor addresses or the microprocessor with the line number substitutes for the middle bits. These signals are coupled to OR means illustrated generally at 110. The four signals from the multiplexer 90 are the signals XADR08+R0; XADR-09+R0; XADR10+R0; and XADR11+R0. Similarly, the four output signals from the multiplexer 92 include the signals XADR08+T0; XADR09+T0; XADR10+T0; and XADR11+T0. These signals are OR'd at the circuit 110 and there are provided four separate output signals that couple to the XRAM 22. These are the signals XADR08+00; XADR09+00; XADR10+00; and XADR11+00.

As previously indicated, the X-bus and the XRAM can be addressed either in a direct mode or in a line page mode by either microprocessor. In this regard, refer to FIGS. 1 and 3 where it is noted that, for example, the receive address bus 16 couples directly without any bit substitutions to one side of the multiplexer 90. Similarly, the transmit address bus 20 also couples directly to one side of the multiplexer 92. This alternate form of addressing of the X-address bus 26 occurs because there are some instances in which control is in a non-line number context such as in an interrupt mode when one has to handle something for a line, it is not known what line it is, and in fact it may be a line other than the line being operated upon.

As indicated previously, the channel selector prom 104 has four bits coupled to it from the receive line register 106. In this connection note the return line 107 in FIG. 1. Also, there are four bits coupled to the prom 104 from the transmit line register 108. Note the return line 109 in FIG. 1. There are also two other bits coupled to the prom 104 for a total of 10 bits thus effectively making it a 1K prom although in fact it has been implemented by a 2K prom. Of the 2 other bits, one is used for a QLT mode which relates to quality logic testing. This is not described in any detail herein because it is not believed to be directly pertinent to the present invention. The other signal to the channel selector prom is the signal XADR19+00. The address XADR19 is the lowest order bit of the X-address bus.

With respect to the block diagram of FIG. 1, refer again to the decoder 97 and the decoder 100. With regard to the decoder 97 the lowest line coupling therefrom has been referred to as the hardware strobes, address 12,XXX. That output couples by way of line 99 to the decoder 100 for providing hardware decoded strobes. There is a write strobe and there are two leads shown drawn out of the decoder 100. Again, refer to FIG. 2 and the decoders 100A and 100B and in particular the decoder 100B. These are the signals POPRCN— and POPTCN— as described previously. The receive channel number has a physical address of 12,004 while the transmit channel number has a physical address of 12,005. If either microprocessor does a physical write to address 12,004, the signal POPRCN— goes low and then high. The time period of that signal is approximately two bus cycles or 250 nanoseconds. The prom 104 cycles in approximately 85 nanoseconds and therefore the outputs are strobed at the end.

From the decoder 100 below the receive channel number output signal, there is the transmit channel number signal which is an address of 12,005. If either microprocessor does a write to a physical address of 12,005, that line will transition low and then go back high again after approximately about 2 cycles or 250 nanoseconds.

Referring now again to FIG. 3, and in particular the receive and transmit channel registers 106 and 108, it is noted that the signal POPRCN-00 clocks the register 106 while the signal POPTCN-00 clocks the register 108. It is to be noted that either microprocessor 10 or 12 can clock the other or its own line register. However, one must therefore strictly impose the discipline that only the receive microprocessor will ever do a write to physical address 12,004 and only the transmit microprocessor will ever do a write to address 12,005. Once that discipline is established, the least significant address bit is always a "1" when the transmit microprocessor is trying to change its channel number and it is always a "0" when the receive microprocessor is trying to change its channel number. Thus, with one low order bit, namely signal XADR19+00, brought to the prom 104, the prom can then determine which of the two channel numbers is to be changed.

Reference is now made to the manner in which the prom 104 is programmed so as to determine the manner in which the registers 106 and 108 are changed. Only one microprocessor can change a channel number at a time because only one microprocessor can have access to the X-bus during one bus cycle. The two registers 106 and 108 that are being controlled have separate clocks so that the microprocessors can change their channels independently. Furthermore, as indicated previously, the clocking of these registers is caused by harware decodes of memory addresses that differ by only one address bit. Then, by convention, only the receive microprocessor would access its strobe and only the transmit microprocessor its strobe. The determination of which would be the next channel for either processor is made by the prom 104. The prom has knowledge of the present channel for each microprocessor along with which one of the microprocessors wishes to change its channel number.

The prom 104 is programmed with the following considerations being made. The receive microprocessor 10 regresses through channel numbers in a reverse direction. Of the hex identified channels 0-9 and A-F, the receive microprocessor services channel F and then channels E, D, C, B, A, 9, 8, 7, 6, 5, 4, 3, 2, 1, 0, F. The transmit microprocessor progresses in the normal forward direction as follows 0, 1, 2, 3, 4, 5, 6, 7, 8, 9, A, B, C, D, E, F, O. It has been found that by using this progressive-regressive scheme that all channels are accessed with none locked out. Any skipped channel is accessed in a subsequent cycle.

The foregoing sequence assumes that there is never a conflict. However, with this scheme there is apt to be a conflict once around the sequence. This is handled by the prom 104.

The transmit and receive microprocessors cooperate to handle the combined task of sending and receiving data over multiple (in the disclosed embodiment 16) data channels. When one microprocessor has its operating process gain access to any specific line table by suspending, it is guaranteed to have virtually exclusive accesss to that line table and all information in it. The only exceptions are those pieces of information which are handled by interrupts on either microprocessor. These exceptions, not directed to the invention, are not described in any detail herein. This assumption means that one microprocessor does not have to check to see if the other microprocessor has access, since by hardware/firmware definition, the other microprocessor cannot be using or changing that information at the same time.

When there is a conflict, if the transmit microprocessor is trying to go from "0" to "1" at the same time that the receive microprocessor is at line "1", since it is a transmit microprocessor the address being strobed is the address 12,005. The least significant bit of this address is a "1", therefore, the signal XADR19 into the prom will be a "1". At that point in time, at the instant that the signal goes to a "1", the prom switches its addresses. It will see that the transmit microprocessor is at channel 0 trying to go to channel 1. However, if the receive microprocessor is already at channel 1, the number coded into that prom at that location will be a 2 so that the transmit microprocessor will simply skip channel 1 and go instead to channel 2. When the clock goes high, channel 2 address is clocked into the transmit channel number.

It is noted that the prom 104 is continuously monitoring the channel numbers. However, the only time that one cares about what is outputted from the prom 104 is when in fact either the signal POPRCN− goes low or the signal POPTCN− goes low.

Next in order is a discussion of the firmware associated with the concepts of the invention. In this regard, it is noted that the present system operates on the basis of task suspensions in communicating between microprocessors rather than with the use of interrupts. In this regard, when one of the microprocessors gains control of the line table by suspending onto it, it continues the process already begun on behalf of that channel by starting at the "suspend point" indicated in the line table and continuing to process that piece of work until it again suspends off of that line table onto another. During this period of time, the microprocessor has exclusive use of that line table, which it gives up when it suspends off of that line table.

This concept is carried out in accordance with the previously mentioned scheme of having one of the microprocessors work on tasks for channels in ascending order while the other counts down. The suspend concepts involve saving the suspend address for use at resumption. This is followed by the indexing of the appropriate channel number register. Next, the resume address is picked up and branched to.

Figure 7:
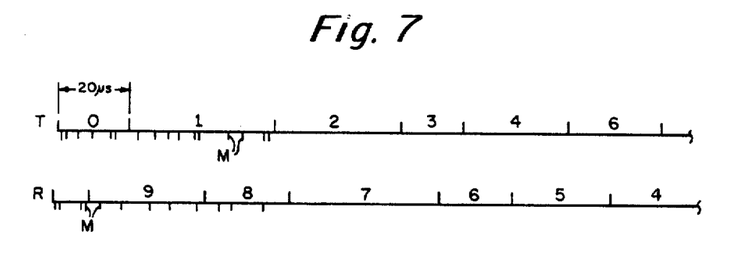
FIG. 7 illustrates the sequence of both transmit and receive microprocessors illustrating the sequencing of channel numbers.
Figure 8:
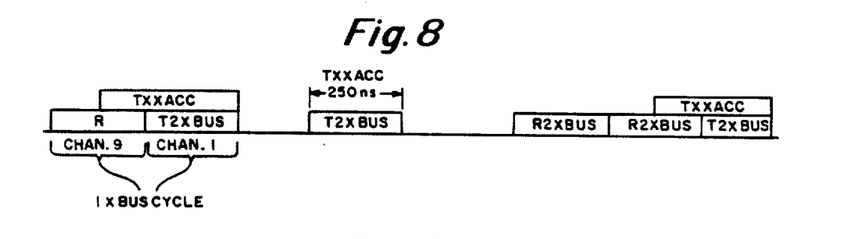
FIG. 8 is a timing diagram illustrating the interleaving of cycles for the transmit and receive microprocessors.
Figure 9:
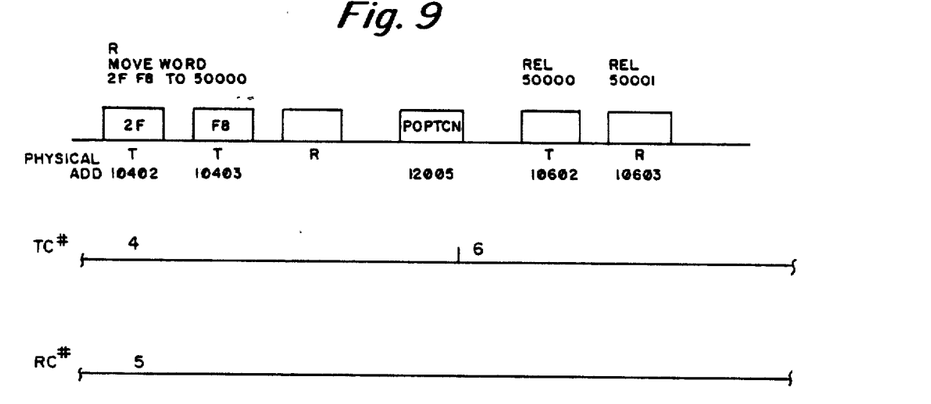
FIG. 9 is a timing diagram illustrating the suspend function in a channel number conflict situation.

Reference is now made to further timing diagrams helpful in illustrating the control concepts of the present invention as applied to dual microprocessors for transmit and receive functions. Briefly, FIG. 7 illustrates the sequence of both transmit and receive microprocessors illustrating the sequencing of channel numbers. FIG. 8 is a timing diagram illustrating the interleaving of cycles for the transmit and receive microprocessors. FIG. 9 is also a timing diagram illustrating the suspend function in a channel number conflict situation.

The timing diagram of FIG. 7 illustrates the fact that each of the two microprocessors operates on behalf of one channel at a time. FIG. 7 also illustrates that each microprocessor is precluded from operating on behalf of any channel if the other microprocessor is already working on "that" channel. In particular, in FIG. 7, note the point where the transmit microprocessor goes from channel 4 to channel 6. This is an example of a sensed conflict because the receive microprocessor was already working on channel 5 at the time that the transmit microprocessor suspends. Accordingly, from the hardware described herein, the transmit microprocessor is instead sent to channel 6 thereby avoiding having both microprocessors accessing the same line table at the same time.

Incidentally, in FIG. 7 the marks M generally indicate X bus cycles. Typically, the duration of a channel is several microseconds. Note in FIG. 7 channel 0 having a duration of, for example, 20 microseconds.

FIG. 8 is also a timing diagram representative of a small segment of the diagram of FIG. 7 in the area of the transmit channel 1 and the receive channel 9. FIG. 8 illustrates the interleaving of cycles for the transmit and receive microprocessors on the X bus, showing that only one microprocessor has access during one bus cycle. If there is a contention conflict at this level, the losing microprocessor is stalled until the other microprocessor ends that bus cycle. Because the signals POPTCN and POPRCN are signals that are decoded off the X bus, they cannot occur simultaneously.

In FIG. 8 note that the receive microprocessor has access first accessing the line table corresponding to channel 9. There is then a request for access by the transmit microprocessor and during the next bus cycle, the transmit microprocessor has access and this access is to the line table corresponding to channel 1. It is noted in FIG. 8 that the period of each bus cycle may be on the order of 250 nanoseconds.

FIG. 9 is also a timing diagram illustrating the transmit microprocessor suspending from channel 4 to channel 6. In FIG. 9, note that there are initially two bus cycles relating to the transmit microprocessor for establishing a new suspend point, the place to pick up at when one returns to this line table. Also note the signal POPTCN at physical address 12005 which has the effect of clocking the transmit register. In this particular example, because the receiver is already on channel 5, the logic involving the PROM 104 thus clocks from channel 4 to channel 6 for the transmit register.

In FIG. 9 the signal TC# represents the contents of the transmit channel or line number register. The signal RC# represents the contents of the receive channel or line number register.

It is also to be noted in connection with FIG. 9 that although channel 5 has been skipped as far as the transmit microprocessor is concerned, this channel will be picked up at a later time in the sequencing. Thus, either of the microprocessors is not precluded from accessing any of the line tables, merely from accessing the same line table as the other microprocessor at the same time.

As indicated previously, both the receive microprocessor and the transmit microprocessor may be of type 68008. These microprocessors typically have 8 address registers and 8 data registers. The address registers are typically referred to as registers A0-A7. In each microprocessor, an address register is dedicated to point to the appropriate suspend address in the line table. Register A0 is adapted to point at physical address 50,000 which is the location 0 at the beginning of the line table. The address register A4 points to the physical address 50,002. This points to the receive microprocessor suspend address in the line table. Again, refer to FIG. 4. The address register A4 is always left pointing to the physical address 50,002 to make the readout more easy. The readout occurs in two byte quantities.

When a task is to be suspended by one of the microprocessors then in that particular line table the appropriate suspend address, the address to be returned to, is appropriately stored. Subsequently, this suspend address is read into register A5. Register A4 looks at the contents of register A5 and the contents are transferred to the microprocessor program counter. The firmware code corresponding to that address is then read and processing resumes from that position. It is to be noted that in accordance with the invention there is employed a re-entrant code so all 16 lines operate on using the same code. The code is not modified, only the data is. The code is disposed in the prom associated with each microprocessor.

For a discussion of the firmware, refer to FIG. 5 herein, which is one of multiple sheets of firmware. This particular firmware listing is identified as RXDAT which means that it corresponds to the state where the receive microprocessor is looking for data to be available for it in the receive fifo 60.

In the following discussion reference will be made to listing numbers in the left column of FIG. 5. At listing number 1134 a word is moved from RXDATO to RXSTAD. This represents a re-start point if an error occurs. The next step at listing line 1136 indicates a clearing of the signal NOGKFCT. This represents a counter clear. The next sequence as indicated by the description to the right in FIG. 5 involves the suspend. As in accordance with the present invention a word is moved that equals the address of RXDA00 from the X-ram line table to the register A4. Register A4 is one of eight address registers of the respective microprocessor. This means that register A4 has been previously set-up and is normally always set-up on the receive microprocessor to point to its suspend address. That address is moved into a physical location in the line table in the XRAM for this line number which happens to equal 50,000 which is a paged address equivalent to 10,000 along with the channel number. For example, if this was channel number 4, it would be equal to 10,400. However, it can be assumed that the address is 50,000 as the system does not know that channel it is on. The system may be on any channel.

The next step is to move a byte in DO to RXCHN(A3). In this connection refer to listing number 1138 and 1139 in FIG. 5. This move will initiate a write to physical location address 12,004. This clocks the receive channel number. At that point in time the prom 104 is fed by both the transmitter and receiver line numbers. Also, the prom knows that it is the receive microprocessor that is active because the address XADR19 is a zero because it is location 4 and not location 5 of the address. The least significant bit is a "zero". This action sets the proper channel number for the receive channel knowing where the transmit channel register is set. This is all accomplished automatically by the prom 104 without being concerned as to where the transmit microprocessor actually is.

The next step from the firmware listing FIG. 5 is represented by listing number 1140. The next step is to move a word from the contents of register A4 which still is pointing to address 50,000 (now it is on a different line table) into register A5 (another of the microprocessor address registers). So a word is moved from the contents of register A4 into register A5. A word is read out of this new line number. The next step is a jump to the contents of register A5 so that wherever the suspend occurred that is where operation resumes. The OPCODE that is fetched will be at that suspend address.

After the above sequence has been completed one is now at listing number 1143. This is the step RXDA00. This sets up a new suspend point.

It is apparent from FIG. 5 that the sequence is one in which a series of micro-instructions are carried out and then at the end of these instructions a suspend occurs. In association with FIG. 5 also refer to the representative line table of FIG. 4. With respect to the receive microprocessor, location 0 is read out of the line table which is the physical address of 10X (X being the line number)00. This is the position where the suspend address is stored and when a suspend occurs the first thing to carry out is an increment of the line register. Next, read out of that location, put it in to register A5 and then jump to that location which is the location of register A5. In basically a three-step process there has been a move from one line to another with no context saved. All the context is in the fact that this is a firmware state machine. The act of suspending actually consists of moving the byte DO to RXCHN which is the address 12,004. Move the word, in other words read the word out of the new line tables suspend address, the receive or transmit suspend address, and then jump into it. This is the mechanism of suspending.

Reference is now further made to the algorithm for the prom 104. As has been indicated previously, the prom 104 is adapted to control the transmit and receive channel registers 106 and 108. The prom 104 is adapted to control the line registers so that the receive microprocessor proceeds with an increasing count while the transmit microprocessor proceeds with a decreasing count. The algorithm says that the receive channel number goes from one number such as from F to E, always decrementing unless the transmit channel is already one less than what the receive channel number is. In this case the receive channel number is set to two less than it presently is. Similarly, the transmit channel number is allowed always to increment unless the receive channel number is equal to, at the moment, one greater than the present state of the transmit channel number in which case the transmit channel number is equal to two more than its present one. This algorithm is burned into the prom.

Having now described a limited number of embodiments of the present invention, it should now be apparent to those skilled in the art that numerous other embodiments and modifications thereof are contemplated as falling within the scope of the present invention as defined by the appended claims. The present system has been described with the use of a single transmit microprocessor and a single receive microprocessor. However, the principals of the present invention may also be employed in a system in which there are more than two microprocessors used. For example, there may be two receive microprocessors and two transmit microprocessors. In this instance, and in connection with the block diagram of FIG. 1, there will be two receive channel registers and two transmit channel registers. There also will be additional inputs therefrom to the prom 104.

APPENDIX A

DECODER 76 PAL EQUATIONS

RXRAM = RXASTB * /RADR03 * /RADR04
RXROM = RXASTB * /RADR03 * /RADR04 * /RADR05
RXXACC = RXASTB * RADR03 * /RADR04
RXGKFA = RXASTB * /RADR03 * RADR04
REEPRM = RXASTB * /RADR03 * RADR04

DECODER 80 PAL EQUATIONS

TXRAM = TXASTB * /TADR03 * /TADR04
TXROM = TXASTB * /TADR03 * /TADR04 * /TADR05
TXXACC = TXASTB * TADR03 * /TADR04
TXDUSC = TXASTB * TADR03 * TADR04 wherein * = AND and  l = negation.

What is claimed is:
1. A dual microprocessor control system comprising;
a first microprocessor,
first address and data busses associated with said first microprocessor,
a second microprocessor,
second address and data busses associated with said second microprocessor,
memory means having address and data busses associated therewith,
means intercoupling the first and second microprocessor data busses to the memory means data bus,
means intercoupling the first and second microprocessor address busses to the memory means address bus including first and second means for establishing channel numbers, corresponding by number to line tables of said memory means, and for storing an indication of the active channel number associated with respective with first and second microprocessors, and control means for changing numbers and thus memory means addressing, but preventing the means for establishing for each microprocessor from addressing the same channel simultaneously, said control means having means for receiving channel number signals from both said first and second means, having a control input for receiving a control signal for selection of which channel number is to change and having means coupling to said first and second means for establishing channel number change.

2. A dual microprocessor control system as set forth in claim 1 wherein said first microprocessor comprises a receive microprocessor.

3. A dual microprocessor control system as set forth in claim 2 wherein said second microprocessor comprises a transmit microprocessor.

4. A dual microprocessor control system as set forth in claim 3 including input data circuit means for transmitting data to and receiving data from both microprocessors.

5. A dual microprocessor control system as set forth in claim 4 wherein said data circuit means has a data bus and address bus and said memory means includes a paged memory.

6. A dual microprocessor control system as set forth in claim 5 including means for coupling the data circuit means data bus to the transmit microprocessor data bus.

7. A dual microprocessor control system as set forth in claim 6 including means for coupling the data circuit means address bus to the transmit microprocessor address bus.

8. A dual microprocessor control system as set forth in claim 7 including means for coupling the data circuit means data bus to the receive microprocessor data bus including a receive fifo data bus.

9. A dual microprocessor control system as set forth in claim 8 including a fifo coupled to said receive fifo data bus.

10. A dual microprocessor control system as set forth in claim 3 wherein said first and second means includes a receive channel number register and a transmit channel number register.

11. A dual microprocessor control system as set forth in claim 10 wherein said control means includes a programmable memory.

12. A dual microprocessor control system as set forth in claim 11 wherein each register stores multiple bits designating a channel number.

13. A dual microprocessor control system as set forth in claim 1 wherein said first and second means comprise respective first and second channel number registers.

14. A dual microprocessor control system as set forth in claim 13 wherein said control means includes program memory means for controlling the sequencing of channel numbers so that said program memory means increments channel numbers of said first register and decrements channel numbers of said second register.

15. A dual microprocessor control system as set forth in claim 3 including first and second multiplexers one associated with the receive address bus and the other associated with the transmit address bus.

16. A dual microprocessor control system as set forth in claim 15 wherein each multiplexer receives the receive address directly and alternatively receives an address including bits from the respective channel number register.

17. A microprocessor control system comprising first and second microprocessors, a memory means for storing data to be transferred between the memory means and microprocessors, said memory means divided into multiple line tables corresponding to like multiple data channels identified by data channel numbers, means intercoupling the first and second microprocessors with the memory means so as to address said memory means, said intercoupling means including first and second means for establishing channel numbers and for storing an indication of the active channel number associated with respective first and second microprocessors, and control means for changing channel numbers associated with each microprocessor but preventing each microprocessor from simultaneously addressing the same channel as the other microprocessor, said control means having means for receiving channel number signals from both said first and second means and means coupling to said first and second means for establishing channel number change.

18. A microprocessor control system as set forth in claim 17 wherein said first microprocessor comprises a receive microprocessor and said second microprocessor comprises a transmit microprocessor.

19. A microprocessor control system as set forth in claim 18 including input data circuit means for transmitting data to and receiving data from both microprocessors.

20. A microprocessor control system as set forth in claim 17 wherein said first and second means includes a first channel number register and a second channel number register.

21. A microprocessor control system as set forth in claim 20 wherein said control means includes a programmable memory and said memory means includes a paged memory.

22. A microprocessor control system as set forth in claim 21 wherein each register stores multiple bits designating a channel number.

23. A microprocessor control system as set forth in claim 22 including means coupling the channel number from both registers to the input of the programmable memory.

24. A microprocessor control system as set forth in claim 23 including a further input to said programmable memory to indicate which register is to change number.

25. A microprocessor control system as set forth in claim 24 including first and second multiplexers, one associated with the first microprocessor address bus and the other associated with the second microprocessor address bus.

26. A microprocessor control system as set forth in claim 25 wherein each multiplexer receives the microprocessor address directly and alternatively receives an address including bits from the respective channel number register.

27. A microprocessor control system as set forth in claim 17 wherein said control means includes programmed memory means having a control input for receiving a control signal for selection of which channel number of first and second means is to change.

28. A microprocessor control system as set forth in claim 27 wherein said first and second means comprise respective first and second channel number registers.

29. A microprocessor control system as set forth in claim 28 wherein said programmed memory means controls the sequencing of channel numbers so that channel numbers are incremented in said first register and decremented in said second register.

30. A microprocessor control system as set forth in claim 28 including first and second enabling means associated with said first and second registers and for coupling from said registers to said memory means address bus.

31. A microprocessor control system as set forth in claim 28 wherein said programmed memory means, sensing the number of channels stored in each register, has means for enabling skipping of a channel number so as to prevent each microprocessor from simultaneously addressing the same channel.

32. A dual asynchronous microprocessor control system that provides for the transfer of data, control information and signalling information to support operation between a number of terminal devices and a computer system, said adapter system comprising a receive microprocessor, address and data busses associated with said receive microprocessor, a transmit microprocessor, address and data busses associated with said transmit microprocessor, a paged memory means having address and data busses associated therewith, means intercoupling the transmit and receive microprocessor data busses to the paged paged memory means data bus, means intercoupling the transmit and receive microprocessor address busses to the paged memory means address bus including first and second register means for establishing channel numbers, corresponding by number to line tables of said paged memory means, and for storing an indication of the active channel number associated with respective transmit and receive microprocessors, and control means for changing channel numbers associated with each microprocessor, but preventing each microprocessor from simultaneously addressing the same channel as the other microprocessor, said control means comprising programmed memory means for receiving channel number signals from both said first and second register means, said programmed memory means, sensing the number of the channels stored in each register, having means for enabling skipping of a channel number so as to prevent each microprocessor from simultaneously addressing the same channel.

33. A dual asynchronous microprocessor control system as set forth in claim 31 wherein said programmed memory means controls the sequencing of channel numbers so that channel numbers are incremented in said first register means and decremented in said second register means.

* * * * *